Nov. 10, 1959  M. DRODOFSKY  2,911,877
GEODETICAL INSTRUMENTS
Filed Feb. 8, 1957  2 Sheets-Sheet 1

Inventor
Martin Drodofsky
by Singer, Stern & Carlburg
Attorneys

Nov. 10, 1959     M. DRODOFSKY     2,911,877
GEODETICAL INSTRUMENTS

Filed Feb. 8, 1957     2 Sheets-Sheet 2

Inventor
Martin Drodofsky
by Singer, Stern & Carlberg
Attorneys

United States Patent Office 2,911,877
Patented Nov. 10, 1959

2,911,877

GEODETICAL INSTRUMENTS

Martin Drodofsky, Heidenheim, Germany, assignor to Carl Zeiss, Oberkochen, Wurttemberg, Germany Application February 8, 1957, Serial No. 639,049

Claims priority, application Germany February 8, 1956

6 Claims. (Cl. 88—1)

The present invention relates to geodetical instruments and in particular to theodolites for making topographical measurements.

It is known in the art to provide the theodolite with a level or the like for adjusting the measuring instrument to exactly vertical position, and such an adjustment is rather complicated and time consuming. It was suggested as an improvement to provide the theodolite with a level which is pivotally connected with the operating means which effects a micrometric displacement of the index mark in the viewing device so that the displacement of the bubble is a measure of the micrometric displacement of the index mark. In this arrangement the scale of the micrometer is stationary in the instrument and there are present certain difficulties when transferring the correct angle between the level and the micrometer.

It is, therefore, an object of this invention to provide an improved theodolite which will permit accurate and quick measurements.

According to the invention the elimination of these disadvantages are effected by employing the image of the level upon a micrometer scale as a scale-reading index, and the micrometer scale is arranged displaceable relative to said index for the adjustment to coincidence. By contrast to the prior art the level in the instrument of the present invention is mounted fixedly in the instrument.

This arrangement avoids the aforesaid disadvantages and nevertheless offers the advantage of the automatic allowance compensation for small errors in the position of the vertical axis.

This embodiment of the present invention has the further advantage compared with the prior art which employs a swivelling level that the micrometer scale may be in fixed connection with a plane-parallel plate when the displacement of the index is effected by a tilting of the plane-parallel plate, so that any arrangement of levers or some such movement transmission device between the level and the plane-parallel plate is dispensed with. This means that the construction of the instrument is simplified. Some simplifications also result with respect to the image-forming optical system compared with the embodiment with the swivelling level in that here at least one end of the bubble in the level may be projected upon the micrometer scale and in that the micrometer scale may be projected together with the image of the level into a scale-reading window. This means that the level need no longer be projected into the field of view of the microscope by a separate image projection device.

With these and other objects in view, the invention will now be described in more detail with reference to the accompanying drawings, in which.

Figure 1:
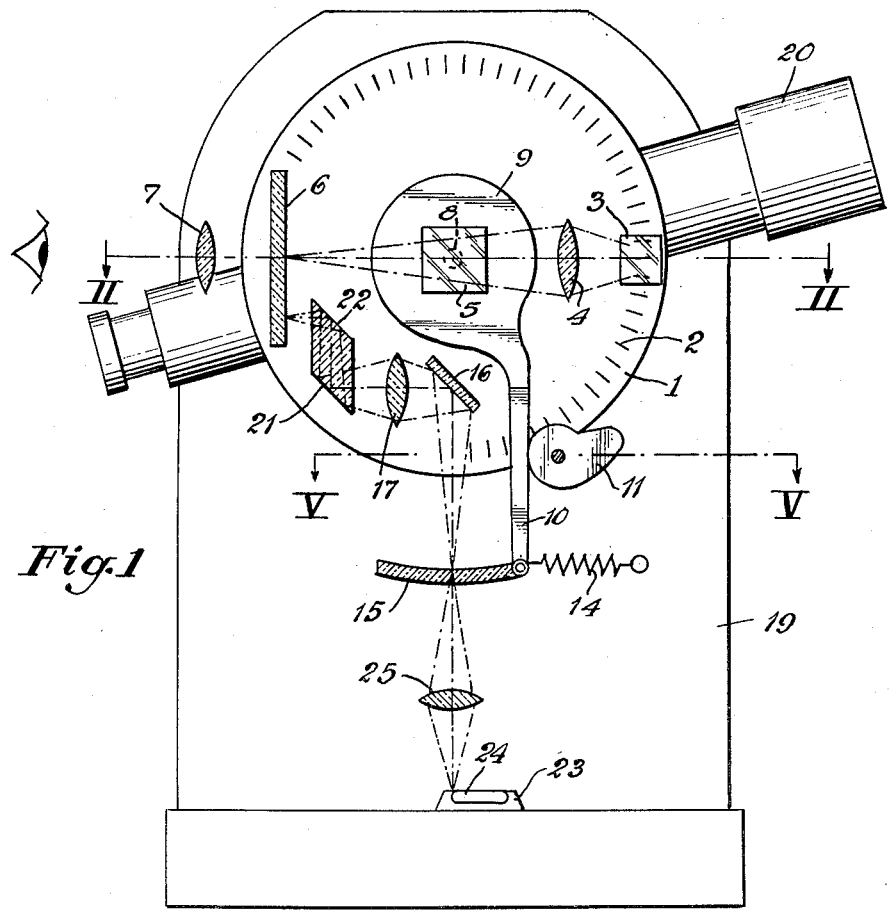
Figure 1 illustrates diagrammatically a side elevational view of a theodolite and a sectional view of the reading device along the line I—I of Fig. 2.
Figure 2:
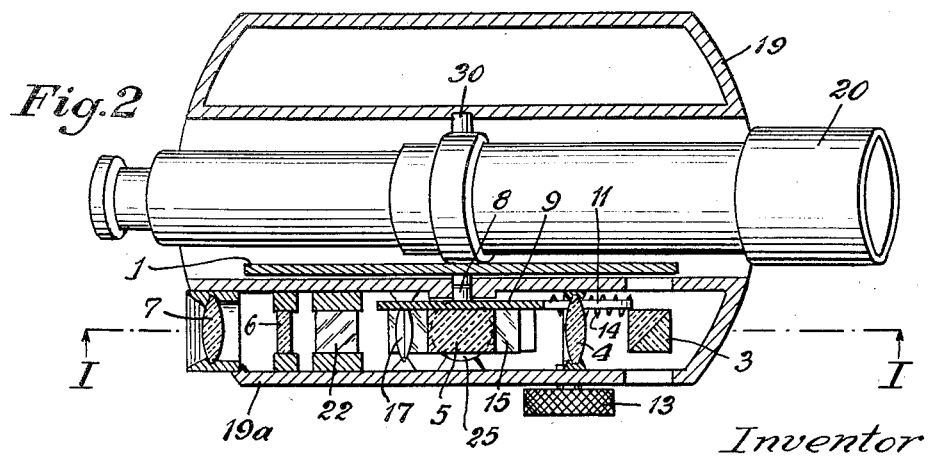
Figure 2 shows a horizontal sectional view along the line II—II of Fig. 1.

Referring to the drawings, Figure 1 illustrates a theodolite provided with a reading device in accordance with the present invention. A frame structure 19 has mounted therein a telescope 20 rotatable about a horizontal axis indicated by the shaft stubs 30. A circular graduated disc 1 is fixedly attached to said telescope 20 and rotates with the same about said horizontal axis. When the disc 1 is rotated the graduations 2 on the same move past a reflector 3 which has a reflecting face inclined relative to said disc at an angle of 45°. An image of the scale is reflected by the reflector 3 through lens 4 upon a plane parallel plate 5 and from here upon a graduated plate 6 disposed in the focal plane of the ocular lens 7 of the viewing device. The lens 4, the plane parallel plate 5, the graduated plate 6, and the viewing lens 7 are all mounted in a housing 19a fixedly attached to the frame structure 19. An index mark 18 is provided on said graduated plate 6 (see Figs. 3 and 4) and serves as a pointer for the reading of the graduations 2 on the disc 1 which rotates in a vertical plane. If no other adjustment is provided, the index mark 18 would very seldom coincide with one line of the graduation 2 on the disc 1. In most cases the index mark 18 would point to a place between two graduation lines and would indicate an intermediate value requiring guess work as to the exact value indicated. In order to eliminate such guess work, the plane parallel plate 5 which may consist of a glass cube is rotatably mounted around an axis 8. Rotative adjustment of the plane parallel plate 5 will deflect the light rays from the reflector 3 and the image of the graduation 2 will be moved on the graduated plate 6 upwardly or downwardly.

According to the present invention, rotation of the plate 5 is selected in such a manner that any line of the graduation 2 on the disc 1 may accurately coincide with the index mark 18. By measuring the amount of rotation of the plate 5 the intermediate values of the adjustment can be accurately determined.

Figure 5:
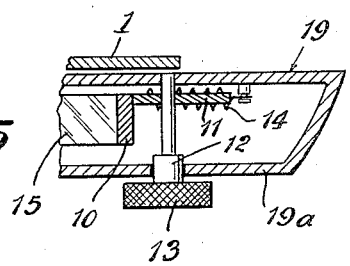
Figure 5 illustrates a partial sectional view of the theodolite similar to that in Figure 2, but taken along the line V—V of Figure 1.

In order to obtain the value of such a precise adjustment the plate 5 is attached to a disc 9 provided with an arm 10. The arm 10 is engaged by a rotatably mounted cam disc 11 which is rotatably adjustable by a micrometer device 12 (Fig. 5), having an operating knob 13. A spring 14 urges the arm 10 into engagement with the circumference of the cam disc 11.

If the micrometer knob 13 is provided with a graduation such an arrangement would be sufficient for exact measurements. But, this would necessitate an additional viewing device which is not desirable. According to the invention the micrometer indication is projected upon the graduated plate 6. For this purpose a transparent carrier 15 with a micrometer scale 15a thereon is fixedly attached to the lower end of the arm 10 and the image of said micrometer scale 15a is projected over a mirror 16, a lens 17, a double prism 21, 22 upon said graduated plate 6. A level 23 is fixedly attached to the frame structure 19. One end of the level bubble 24 is projected over a lens 25 upon said micrometer scale 15a and as described in the above is projected together with the image of the micrometer scale 15a upon said graduated plate 6.

According to the present invention, the image of the bubble 24 is used as an index for determining the position of the adjustable micrometer scale 15a. This arrangement permits a simultaneous viewing of the graduation 2 on the disc 1 and of the micrometer scale 15a, together with the index mark 26 formed by said level bubble 24 on said graduated plate 6. A further advantage of this arrangement is that the theodolite need not be accurately adjusted in its vertical position because small inclinations of the theodolite will be automatically compensated by the respective displacement of the image 26 of the level bubble 24 on the graduated plate 6.

Figure 3:
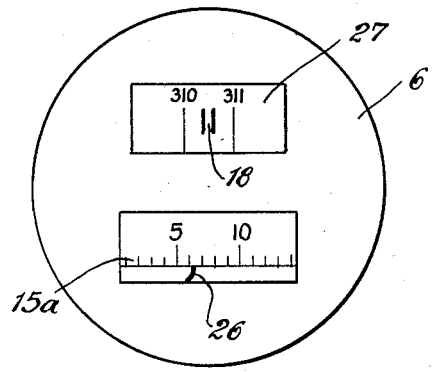
Figure 3 shows the viewing field of the viewing device.
Figure 4:
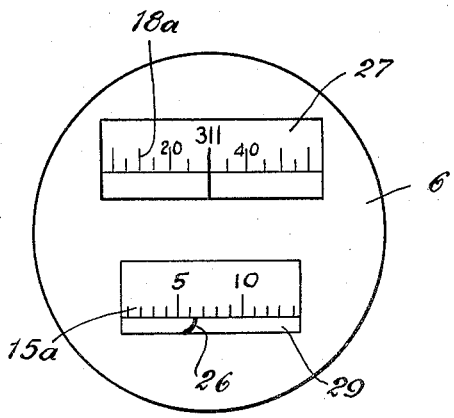
Figure 4 shows the viewing field of a modified embodiment.

The operation of the device is as follows:

The telescope 20 together with the disc 1 is rotated until the desired vertical position is obtained. The graduation lines, for instance, 310 and 311, on the disc 1 are projected upon said graduated plate 6. As shown in Figure 3, a spaced double line index mark 18 is provided in the viewing field 27 of the disc 1 on the graduated plate 6. By rotating the knob 13 of the micrometer device the plane parallel plate 5 will be rotated until one of the lines 310 or 311 will be positioned between the two lines forming the index mark 18. According to the present invention, said index mark 18 may also have the form of a scale, as shown in Figure 4, thus substantially facilitating the reading of the measurement. The rotation of the knob 13 also causes an adjustment of the plane parallel plate 5 and since the end of the bubble 24 remains stationary in the viewing field on the graduated plate 6 the end of the image of the bubble indicates a certain value on the image of the micrometer scale 15a. Any small misalignment of the theodolite relative to the vertical will be automatically compensated by displacement of the image 26 of the level 23 in the viewing field 29 on the graduated plate 6.

Since the bubble in the level is under the action of gravity, the end of the bubble is always correctly adjusted to serve as index mark and if the instrument is, for instance, tilted about a small angle, the bubble compensates such an inclination automatically as long as the projection system for producing an image of the bubble on the carrier 15 is constructed in such a manner with respect to the curvature of the bubble tube that the image of the bubble, for instance, when the instrument is tilted 1°, will be displaced about 1° on the micrometer scale.

From the foregoing it will be apparent that there is provided a substantially improved theodolite which will permit a very accurate reading of the measurements in one single viewing field.

What I claim is:

1. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc, including in a stationary housing, a stationary reflector, an objective, a rotatably adjustable light deflecting optical element, means for forming a graduated viewing field and an ocular lens; means for rotatably adjusting said optical element about a horizontal axis to thereby deflect the light passing through said objective, a movable carrier provided with a micrometer scale fixedly connected with said means for adjusting said optical element, said rotatable adjusting means including an arm fixedly connected in spaced relation from said optical element with said movable carrier, and a micrometer for operating said adjusting means, a level indicating means fixedly mounted on said frame structure, means for projecting an image of said level onto said micrometer scale, optical means for projecting an image of said micrometer scale and the image of the level thereon onto said graduated viewing field, whereby said viewing means permits a simultaneous reading of the graduation on said disc and the images of said level and micrometer scale.

2. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc including in a stationary housing, a stationary reflector, an objective, a rotatably adjustable light deflecting optical element, means forming a graduated viewing field, and an ocular lens, means for rotatably adjusting said optical element about a horizontal axis to thereby deflect the light passing through said objective, a movable carrier provided with a micrometer scale fixedly connected with said means for adjusting said optical element, said rotatably adjusting means including an arm fixedly connected in spaced relation from said optical element with said movable carrier, and a micrometer for operating said adjusting means, a bubble level mounted stationary on said frame structure, means for projecting an image of one end of said bubble onto said movable micrometer scale, optical means for projecting an image of said micrometer scale and the image of said end of the bubble thereon onto said graduated viewing field, whereby said viewing means permits a simultaneous reading of the graduation on said disc and the images of said bubble end and micrometer scale.

3. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc, including in a stationary housing, a stationary reflector, an objective, a rotatably adjustable light deflecting optical element, means forming a graduated viewing field and an ocular lens; a plate with an outwardly extending arm on which said optical element is fixedly mounted, means for rotatably adjusting said plate, including a rotatably mounted cam engaging said arm and adapted to adjust said optical element about a horizontal axis to thereby deflect the light passing through said objective, a carrier provided with a micrometer scale fixedly attached to said arm and a micrometer for rotatably adjusting said cam, a bubble level fixedly mounted on said frame structure, means for projecting an image of one end of the bubble of said level onto said micrometer scale, optical means for projecting an image of said micrometer scale and the image of the end of the bubble of the level thereon onto said graduated viewing field, whereby said viewing means permits a simultaneous reading of the graduation on said disc and the images of said end of the bubble of the said micrometer scale.

4. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc including in a housing a stationary reflector, an objective, a rotatably adjustable light deflecting optical element, means forming a graduated viewing field, and an ocular lens; means for rotatably adjusting said optical element to thereby deflect the light passing through said objective, a movable carrier provided with a micrometer scale fixedly connected with said means for adjusting said optical element, and a micrometer for operating said adjusting means, a level indicating means mounted on said frame structure, means for projecting an image of said level onto said micrometer scale, optical means for projecting an image of said micrometer scale and of the image of the level thereon onto said graduated viewing field, whereby said viewing means permits a simultaneous reading of the graduation on said disc and the images of said level and micrometer scale, said optical element comprising a plane parallel plate, means for rotatably supporting said plate about a horizontal axis, an arm extending from said plate and carrying said movable carrier, and manually operable means for tilting said arm to adjust simultaneously said plate and said carrier provided with said micrometer scale.

5. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc including in a housing a stationary reflector, an objective, a rotatably adjustable light deflecting optical element, means forming a graduated viewing field, and an ocular lens; means for rotatably adjusting said optical element to thereby deflect the light passing through said objective, a movable carrier provided with a micrometer scale fixedly connected with said means for adjusting said optical element, and a micrometer for operating said adjusting means, a level indicating means mounted on said frame structure, means for projecting an image of said level onto said micrometer scale, optical means for projecting an image of said micrometer scale and of the image of the level thereon onto said graduated viewing field, whereby said viewing means permits a simultaneous reading of the graduation on said disc and the images of said level and micrometer scale, said optical element comprising a plane parallel plate, means for rotatably supporting said plate about a horizontal axis, an arm extending from said plate and carrying said movable carrier, and manually operable means for tilting said arm to adjust simultaneously said plate and said carrier provided with said micrometer scale, said manually operable means including said micrometer and a rotatably mounted cam rotated by said micrometer and engaging said arm for tilting the same.

6. In a geodetical instrument, a frame structure, a telescope rotatably mounted about a horizontal axis in said frame structure, a circular disc with a graduation thereon fixedly attached to said telescope and rotatable in a vertical plane about said horizontal axis, means for viewing the graduation on said disc including in a housing a stationary reflector, an objective, a rotatably adjustable light deflecting optical element, means forming a graduated viewing field, and an ocular lens; means for rotatably adjusting said optical element to thereby deflect the light passing through said objective, a movable carrier provided with a micrometer scale fixedly connected with said means for adjusting said optical element, and a micrometer for operating said adjusting means, a level indicating means mounted on said frame structure, means for projecting an image of said level onto said micrometer scale, optical means for projecting an image of said micrometer scale and of the image of the level thereon onto said graduated viewing field, whereby said viewing means permits a simultaneous reading of the graduation on said disc and the images of said level and micrometer scale, said optical element comprising a plane parallel plate, means for rotatably supporting said plate about a horizontal axis, an arm extending from said plate and carrying said movable carrier, and manually operable means for tilting said arm to adjust simultaneously said plate and said carrier provided with said micrometer scale, said manually operable means including said micrometer and a rotatably mounted cam rotated by said micrometer and engaging said arm for tilting the same, said plate and arm rigidly connecting said plane parallel plate and said micrometer scale carrier in spaced relation with one another.

References Cited in the file of this patent

UNITED STATES PATENTS

| | | |
|---|---|---|
| 2,837,956 | Schneider | June 10, 1958 |

FOREIGN PATENTS

| | | |
|---|---|---|
| 427,993 | Italy | Dec. 3, 1947 |
| 692,617 | Great Britain | Jan. 10, 1953 |